Feb. 5, 1935.  J. P. LEINDORF  1,990,191
FOLDABLE BIRD CONTAINER
Filed March 1, 1934
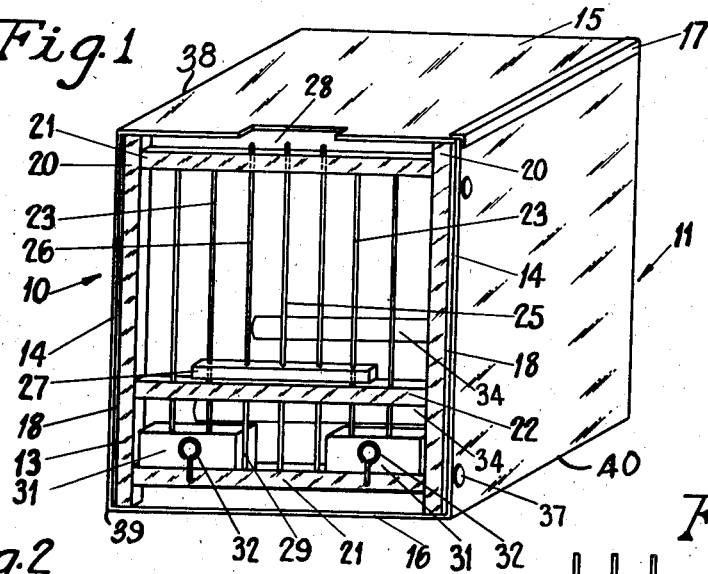
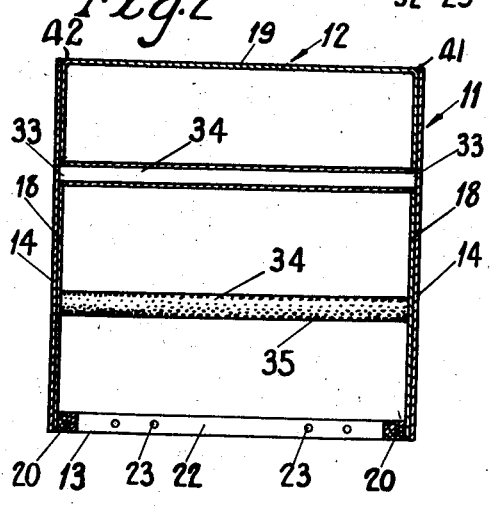
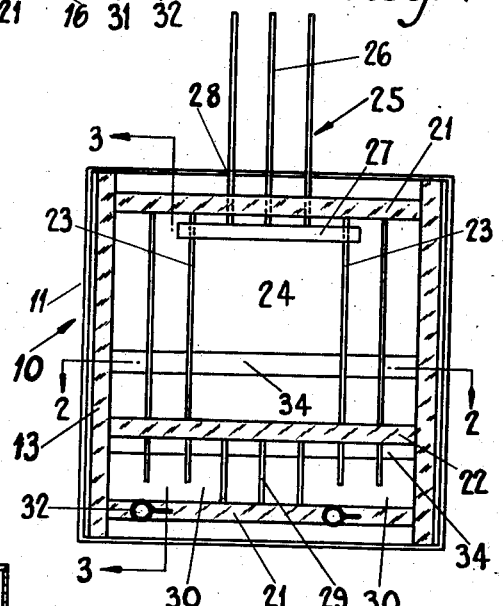
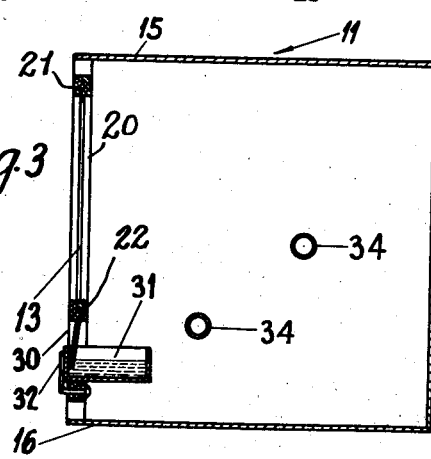
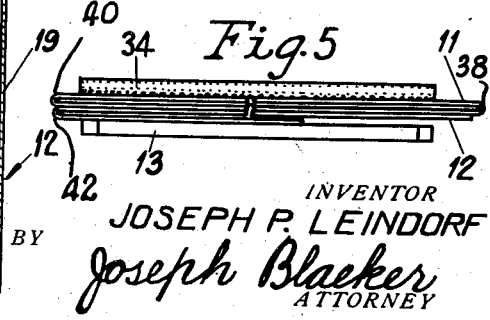
INVENTOR
JOSEPH P. LEINDORF
BY Joseph Blacker
ATTORNEY Patented Feb. 5, 1935

1,990,191

UNITED STATES PATENT OFFICE 1,990,191

FOLDABLE BIRD CONTAINER

Joseph P. Leindorf, Pelham Manor, N. Y.

Application March 1, 1934, Serial No. 713,481

3 Claims. (Cl. 119—17)

This invention relates to a foldable bird container adapted to fold up into a small space when not in use so as to be easily transported from place to place, and which when set up for use will form a substantially rigid structure.

An object of this invention is to provide a foldable bird container which is closed on all sides except the front to prevent drafts on the bird during transit and which will avoid the necessity of covering the container.

Another object of this invention is to provide a foldable bird container having double layers of material in two vertical side walls to prevent collapsing of the container under pressure, as when the containers are stacked up in tiers.

Another object of this invention is to provide apertures in the interior layers of the double layer side walls, the said apertures serving to receive tubular perches which also function as cross-braces to maintain the unitary nature of the assembled device.

Another object of this invention is to provide hollow perches covered on the outside with an abrasive material such as sand to provide a secure grip for the bird.

With the above and other objects in view, the invention will be hereinafter more particularly described, and the combination and arrangement of parts will be shown in the accompanying drawing and pointed out in the claims which form part of this specification.

Reference will now be had to the drawing, wherein like numerals of reference designate corresponding parts throughout the several views, in which:

Figure 1 is a perspective view of an assembled foldable bird container.

Figure 2 is a horizontal sectional view, the section being taken as on line 2—2 in Figure 4.

Figure 3 is a vertical sectional view, the section being taken as on line 3—3 in Figure 4.

Figure 4 is a front elevation of the container, showing the front frame with the door in an open position and without any seed and water cups.

Figure 5 is an edgewise view of the foldable bird container in a folded position, the foldable members being shown broken at about their mid portion.

In the illustrated embodiment of the invention, the several views show a foldable bird container 10, comprising a rectangular outer member 11, a U-shaped inner member 12 and a front frame 13. The outer member 11 is preferably made of a pliable material such as cardboard, the said member being scored or creased at the corners to permit the vertical sides or elements 14 to fold together with the top 15 and the bottom 16. The original blank is cut from a sheet of cardboard or the like and may have the ends glued together with a strip of binding material 17. The U-shaped member 12 is cut from a sheet of cardboard which is scored or creased at the corners to permit the sides or elements 18 to fold together with the back 19.

The front frame 13 is preferably built of wood and comprises two vertical bars 20, secured to upper and lower horizontal rails 21 and to an intermediate rail 22. Two rows of vertical wires 23 have been secured to the upper rail 21 and to the intermediate rail 22. The rows of wires 23 have been positioned near the vertical bars 20 so as to leave a central opening 24 for a door 25. The door 25 comprises a plurality of wires 26 secured to a rail 27. The rail 27 is provided with apertures for engagement with the two wires 23 adjacent the opening 24 and is slidably mounted on the said wires. The wires 26 are slidably mounted in apertures in the upper rail 21. The door 25 is thus slidably mounted and may be moved up to the open position shown in Figure 4, when the wires 26 are free to move upwards through an opening 28 in the top 15. A plurality of wires 29 have been centrally secured to the bottom rail 21 and to the intermediate rail 22 so as to provide openings 30 for seed and water cups 31. The wires 23 extending into the openings 30 terminate short of the lower rail 21 so as to permit entrance of the seed and water cups 31 into the container 10.

Eye-members 32 have been rotatably mounted in apertures in the lower rail 21 and are centrally positioned with respect to the openings 30. The extensions of the wires 23 in the openings 30 have been forced forwardly to meet the eye-members 32. The eye-members may thus be swung downwardly to permit entrance of the cups 31 into the openings 30, and when the outer wall of a cup comes in contact with the extensions of the wires 23, the eye-members 32 may be swung up on the other side of the said wall of the cup and thus hold the cup in frictional engagement and in service position in the opening 30 of the container 10, as best shown in Figure 3.

As best shown in Figures 1 and 2, the assembled container 10 has double layers of material in the two vertical side walls, the double layers consisting of the outer vertical sides 14 of the outer member 11 and the inner side elements 18 of the U-shaped inner member 12. The double layers of material in the two vertical side walls prevent collapsing of the container when under pressure, as when the containers are stacked up in tiers or otherwise subjected to rough usage in transit.

As shown in Figure 2, a plurality of apertures 33 have been provided in the side elements 18, the said apertures serving to receive tubular perches 34 which contact with the inner faces of the outer vertical sides 14 and function as cross-braces to maintain the unitary nature of the assembled container. The perches 34 are preferably covered with an abrasive material such as sand 35 to provide a secure grip for the bird.

The front wall of the container comprises a composite frame having a slidable door and bird-confining bars or wires disposed in properly spaced relation and provides for light and air and means for feeding the bird.

The composite structure described and illustrated comprises three main parts, namely, a foldable rectangular outer member 11 foldable along the edges 38, 39, and 40, a foldable U-shaped inner member 12 foldable along the edges 41 and 42, and a front frame. The said parts may be separately constructed and then assembled and joined together with thumb tacks 37 passing through the side elements 14 and 18 into the bars 20.

It is to be noted that the closed and foldable walls of my container may be made of a single blank of pliable material, and I consider this modification as within the scope of my invention. It is also to be noted that my foldable bird container is closed on all sides except the front and that the closed sides are preferably made of pliable material such as cardboard and that the whole container is constructed to fold into a flat compact package when not in use. The container is intended to be sold for a small sum so that it may be discarded after use for transporting a bird.

Having thus described my invention, what I claim is:

1. A foldable bird container, comprising an outer rectangular member providing the top, bottom and side wall elements, said member being scored at the corners and being foldable, an inner U-shaped member providing a back wall and two inner reenforcing side wall elements, said member being scored at the corners and being foldable and said inner side wall elements having perforations, a cross-brace mounted in said perforation, a front wall comprising a rectangular member made of spaced bars and rails, said member being adapted to enter between said inner side wall elements, and means for securing said members into unitary relation.

2. In a foldable bird container, a front frame comprising spaced bars and upper and lower rails, a rail interposed between said rails and spaced from the lower rail to form openings for feed cups therebetween, a plurality of downwardly extending bars projecting from said interposed rail and stopping short of the lower rail, said bar projections being bent towards the front face of said frame, and eye-members rotatably mounted in the lower rail and substantially centrally of said bar projections, said eye-members and said bar projections serving to grip a wall of a feed cup and hold said cup in service position in said container.

3. A foldable bird container, comprising an outer rectangular member providing the top, bottom and side wall elements, said member being scored at the corners and being foldable, an inner U-shaped member providing a back wall and two inner side wall elements, said member being scored at the corners and being foldable, a front wall comprising a rectangular member made of spaced bars and rails, said member being adapted to enter between said inner side wall elements, means for mounting one or more perches in said container, said front wall engaging said two inner side walls and top and bottom walls, and securing means extending through the double side walls and the front wall.

JOSEPH P. LEINDORF.